Oct. 25, 1949.　　　R. N. HARTZELL　　　2,485,827
PROPELLER FOR AIRCRAFT

Filed Nov. 5, 1945　　　　　　　　　　　　2 Sheets-Sheet 1

INVENTOR
ROBERT N. HARTZELL
BY
Toulmin & Toulmin
ATTORNEYS

Oct. 25, 1949. R. N. HARTZELL 2,485,827
PROPELLER FOR AIRCRAFT
Filed Nov. 5, 1945 2 Sheets-Sheet 2

INVENTOR
ROBERT N. HARTZELL
BY
Toulmin & Toulmin
ATTORNEYS

Patented Oct. 25, 1949

2,485,827

UNITED STATES PATENT OFFICE 2,485,827

PROPELLER FOR AIRCRAFT

Robert N. Hartzell, Piqua, Ohio, assignor to Hartzell Industries Inc., Piqua, Ohio, a corporation of Ohio Application November 5, 1945, Serial No. 626,693

2 Claims. (Cl. 170—159)

My invention relates to propellers and in particular to propellers for aircraft.

It is an object of my invention to provide a propeller and method of making it which consists of a one-piece molded plastic reinforced construction, the reinforcing consisting of fabric embedded in plastic and with the warp of the fabric arranged parallel to the major longitudinal axis of the propeller or substantially parallel thereto.

It is a further object of the invention to provide a propeller that is inert to the action of the weather, substantially free from vibration, and that has a surface that is smooth and free from any obstructions and capable of taking a streamlined cross-section.

It is a further object to provide a propeller in which the shank and blade are molded in one piece.

It is a further object of the invention to provide a plastic propeller reinforced with layers of reinforcing fabric in which the warp threads of the fabric are parallel to the longitudinal axis of the propeller or at a small angle thereto, the propeller being so formed that after being brought to size and shape it is heat treated to convert the plastic into its final condition.

It is an object to provide a thermosetting plastic resin fabric reinforced propeller which consists of a plurality of independent layers of fabric impregnated material which is compressed to shape and heated so as to convert the plastic from a thermoplastic to a thermosetting condition and to produce a smooth homogeneous composite body that absorbs the vibration of a propeller and provides the requisite strength with lightness that is free from corrosion and attack by the elements.

It is an object to provide a method of manufacturing the propeller consisting of superimposing a plurality of plastic coated and impregnated layers of fabric to form a preliminary body of approximately the dimension of a propeller, but generally larger in size.

Thereafter it is an object to place such body of superimposed layers of fabric and plastic material such as the thermosetting resin in a mold and subject the body of material to compression and to forming into the shape of a propeller to reduce its overall size and to compress it into a compact body and to apply requisite heat so as to convert the plastic from a thermoplastic state to a thermosetting state in order to produce a propeller body reinforced with fabric of the shape of a propeller with a smooth exterior that needs no further work to be done upon it to bring it to shape both for the propeller and for the shank.

Heretofore in the art, metal propellers have been made of aluminum, steel and other similar materials or of wood, preferably laminated wood, but in all cases serious problems of vibration, corrosion and destruction by the elements have been presented. The problem of weight has always been a factor but particularly the problem of reinforcing the propeller has been one of the primary considerations. The reinforcing added to the weight and if it was not arranged correctly it would add to the liability of excessive vibration which would destroy the propeller and upon occasion the aircraft as well as the engine. By the adoption of the propeller of the present invention it is possible to provide such a propeller that meets the requirements of lighter weight than heretofore possible, of a smooth surface that has increased the speed of small aircraft as much as five miles per hour, of a propeller that has a smooth surface impervious to the elements and a propeller that is reinforced by the fabric so that there is susbtantially no vibration.

One of the unexpected results of this construction has been that vibration and noise is absorbed by this propeller. Not only does the propeller not increase the vibration or noise but it actually decreases it by acting as an absorbing medium.

Referring to the drawing:

Figure 1 is a diagrammatic plan view of a tip of a propeller. The heavier lines running parallel to the longitudinal axis of the propeller indicate the warp threads of the reinforcing fabric while the lighter lines indicate the woof lines.

Figure 2 is a similar view showing a modification with the warp lines at a slight angle to the longitudinal axis of the propeller. In this view a portion of the propeller has been broken away to show one of the interior layers. In such instance the layers alternate in the angular disposition of the warp lines so that they first are directed to the right and in the next layer they are directed to the left.

Figure 1:
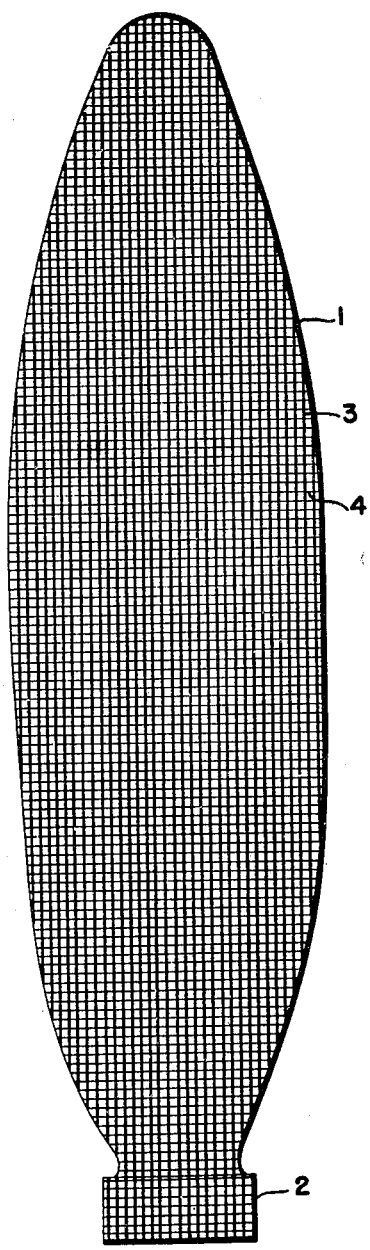

Referring to the drawings in detail, I generally designates the propeller blade having a shank 2. The propeller consists, before it is finally finished, of a plurality of layers of fabric having relatively heavy warp threads 3 and lighter woof threads 4 arranged at right angles to one another to make a straight laid fabric. This fabric is impregnated with and embedded in a body of thermosetting resin designated 5. This resin is of the type that when heat is applied at a critical temperature it converts from a thermoplastic condition to a thermosetting condition. This is what is known as an irreversible resin. After the application of heat it becomes hard, impervious to the usual acids and alkalis and presents a smooth and impenetrable body.

Figure 4:
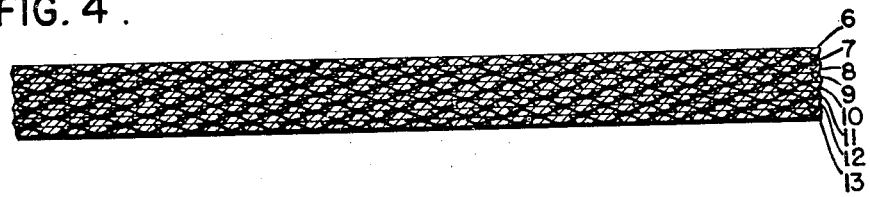
Figure 4 is a section on the line 4—4 of Figure 3 and showing the superimposed layers af fabric and resin prior to molding.
Figure 5:
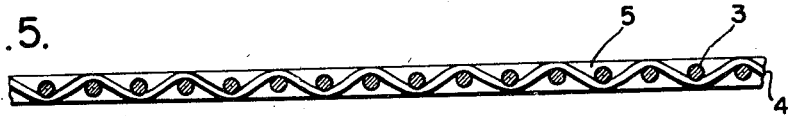
Figure 5 is a detailed enlarged section taken vertically through a layer of plastic and of fabric indicating the nature of bonding and impregnation of the fabric with the resin.

A plurality of layers of such fabric treated with resin are laid one upon the other as indicated in the layers 6, 7, 8, 9, 10, 11, 12 and 13 in Figure 4. The warp threads are arranged parallel or at a slight angle to the longitudinal axis of the propeller. The sheets of superimposed layers are cut generally to the size and shape of the propeller.

Figure 2:
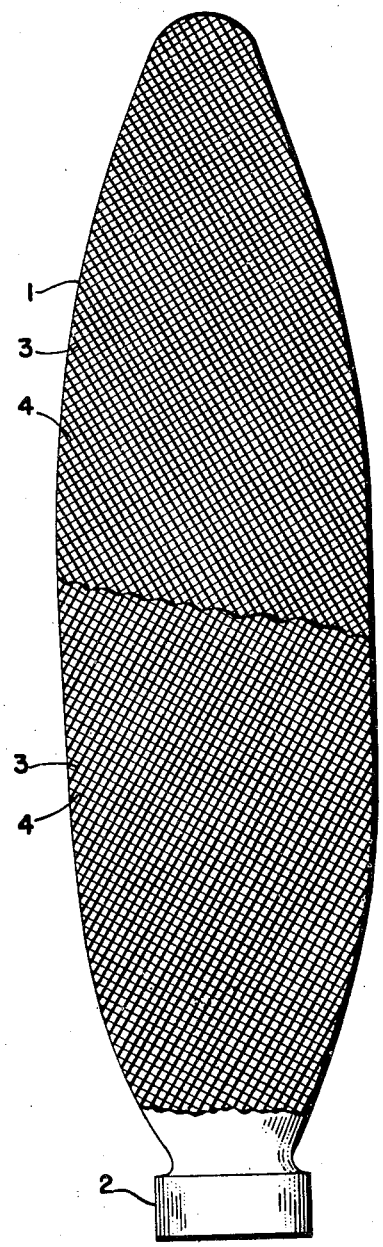
Figure 3:
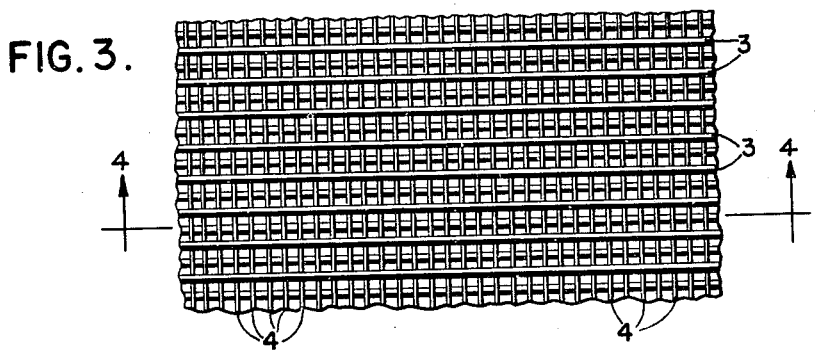
Figure 3 is a plan view of a typical portion of reinforcing fabric.
Figure 6:
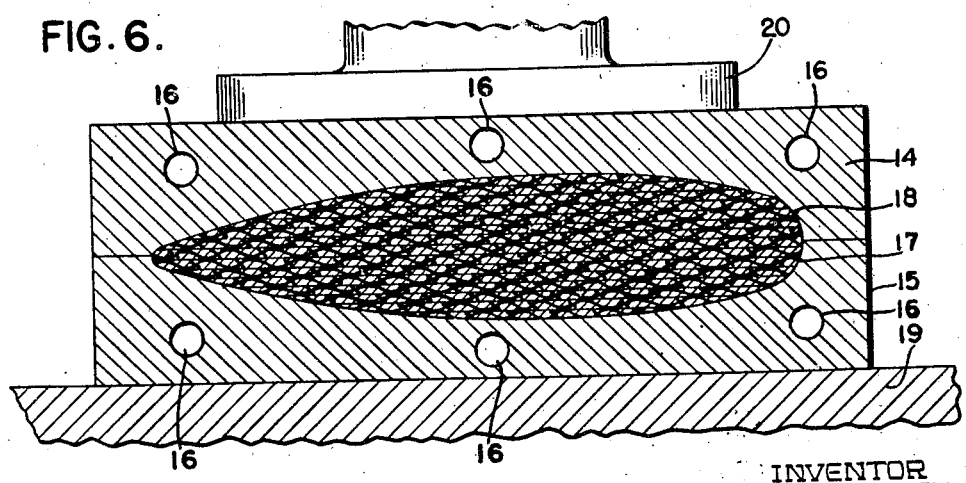
Figure 6 is a section through a press showing the plastic body reinforced with fabric as ultimately compressed in order to produce the complete propeller.

It is then placed in the mold having an upper half 14 and a lower half 15. Each of these molds is provided with steam passageways 16 through which steam or hot liquids are circulated in order to heat the mold and the contents of the mold. The lower mold cavity is designated 17 and the upper mold cavity is designated 18. The mold halves are mounted between the bed 19 of a press and the platen 20. When the mold halves are closed upon the body of plastic and fabric shown in Figure 4 the propeller shape is imparted to this body as indicated in Figures 1, 2 and 6. The result is that the configuration of a propeller is produced in a compressed body of plastic reinforced by fabric with the warp threads running parallel to the longitudinal axis or at a slight angle thereto. By the application of heat the thermosetting resin is converted from a plastic condition to a non-plastic condition and remains in that irreversible condition as a hard body of plastic material smooth on the exterior and impervious to the action of the elements.

Thus there is formed a composite, homogeneous body of material that has imbedded in it the reinforcing and shock absorbing fabric which serves to take up the vibration and to reinforce the propeller to make it light and strong.

The following gives the data for manufacture of a typical propeller according to my invention:

There are two different types of fabric used in the propeller—⅓ of the material is 8 ounce cotton fabric and ⅔ is the 6.85 ounce unidirectional cotton duck.

It will be understood that the 8 ounce duck has 72 threads in the warp and 28 filling threads.

The 6.85 ounce cotton fabric has 36 pairs of warp threads and 32 filling threads. Each pair of warp threads are twisted together. The warp threads are somewhat heavier than the filling threads so that the strength per inch is 140 lbs. in one direction and only 18 lbs. in the other direction on the 6.85 fabric and 125 lbs. for the warp and 60 lbs. in the filling threads for the other type.

It is necessary to use both types of fabric when the unidirectional fabric is laid directly lengthwise with the propeller, in order to secure added strength crossways of the blades. When the material is laid so that the unidirectional threads are laid at an included angle of 30° the 6.85 ounce fabric is used exclusively. In this case the material being laid at an angle increases the strength of the material across the blade, as well as giving added torsional strength to the piece.

The fabric is bonded together with an alcohol soluble Cresol Formaldehyde resin and is pressed at 2,000 lbs. per sq. in.

When the propeller is molded to final shape there is used the unidirectional material 6.85 laid at a 30° included angle.

When I make the blade from ½" slabs glued together the combination of the two types of fabric are used: ⅓ of the 8 ounce and ⅔ of the 6.85.

The following test of the tensile strength of the materials laid in the various manners described gives further data:

*Test data*

UD 1 15° was built up as follows:

One sheet 15° to the left, one sheet straight on, and one sheet 15° to the right, continuing until the proper thickness was obtained.

UD 1 regular consisted of two sheets of unidirectional cloth laid parallel and laminated, every third sheet being of our regular cloth. The regular cloth in this case is not balanced cloth, but is not nearly as directional as UD 1. I list below the test results on these three combinations:

|  | (1) UD 1, Straight | (2) UD 1, 15° L, Straight, 15° R | (3) 2 of UD 1, 1 of CA |
|---|---|---|---|
| Tensile Strength, lbs./sq. in.: |  |  |  |
| WG | 22,300 | 21,300 | 19,000 |
| AG | 3,800 | 4,160 | 6,090 |
| Flexural Strength, lbs./sq. in.: |  |  |  |
| WG | 36,200 | 33,300 | 32,000 |
| AG | 10,000 | 10,250 | 12,700 |
| Shear Strength: |  |  |  |
| Flat— |  |  |  |
| WG | 9,460 | 9,710 | 9,800 |
| AG | 16,100 | 15,600 | 14,650 |
| Along Laminations | 4,475 | 5,450 | 6,450 |
| Edge, Across Laminations | 15,900 | 16,300 | 15,750 |
| Shear Strength, End: |  |  |  |
| Along Laminations | 4,675 | 5,350 | 5,000 |
| Across Laminations | 9,640 | 10,850 | 10,400 |

These tests were made in accordance with Federal specifications LP 406, and in the case of shear, I used the rectangular specimen in a double shear test.

It will be understood that my invention may be embodied in the variety of forms and that it is adaptable not only to aircraft propellers but to a great variety of other similar mechanisms used either for working in air, liquids or plastics. It will be further understood that a great variety of plastics and of fabrics may be employed. I desire to comprehend within my invention such modifications as may be necessary to adapt it to varying conditions of use within the scope of the hereinafter appended claims.

It will be further understood that I desire to comprehend within my invention longitudinal enforcing means either parallel to the longitudinal axis of the blade or at a slight angle thereto with the woof threads.

I therefore claim the following as coming within the scope of my invention.

Having thus fully described my invention, what I claim as new and desire to secure by Letters Patent is:

1. In a new article of manufacture for use as a propeller, a plurality of layers of fabric of different weights super-imposed one over another and embedded in a thermosetting resin, said fabric layers being so arranged that the warp threads are parallel to the major axis of the propeller said fabric layers being arranged alternately with heavier fabric in alternate layers, at least one of said layers having warp threads that are heavier than the woof threads of that layer, the said lighter layer having a larger proportion of woof to warp threads than the proportion of woof to warp threads in the heavier layer.

2. In combination in a propeller, of a plurality of layers of fabric of different weights embedded in a thermosetting resin, said layers of fabric having their warp lines being arranged parallel to the longitudinal axis of the propeller, at least one-third of the fabric material being of relatively heavy cotton fabric and two-thirds is lighter unidirectional cotton duck, each layer having warp threads that are heavier than the woof threads of that layer, the heavier layer being composed of about 8 ounce cotton duck and the lighter layer being of about 6.85 unidirectional cotton duck, the said lighter layer having a larger proportion of woof threads to warp threads than the proportion of woof to warp threads in the heavier layer.

ROBERT N. HARTZELL.

REFERENCES CITED

The following references are of record in the file of this patent:

UNITED STATES PATENTS

| Number | Name | Date |
|---|---|---|
| 1,365,314 | Frederick | Jan. 11, 1921 |
| 1,367,132 | Frederick | Feb. 1, 1921 |
| 1,384,308 | DeGiers | July 12, 1921 |
| 1,433,728 | Kemp | Oct. 31, 1922 |
| 1,444,959 | Dickey | Feb. 13, 1923 |
| 1,504,547 | Egerton | Aug. 12, 1924 |
| 1,567,574 | Clay | Dec. 29, 1925 |
| 1,875,597 | Heath | Sept. 6, 1932 |
| 2,202,013 | Lougheed | May 28, 1940 |
| 2,398,388 | Norton | Apr. 16, 1946 |

FOREIGN PATENTS

| Number | Country | Date |
|---|---|---|
| 502,409 | Great Britain | Mar. 13, 1939 |